United States Patent
Fujisawa et al.

[15] 3,678,115
[45] July 18, 1972

[54] PROCESS FOR PRODUCTION OF SULFUR-CONTAINING PHENOLS

[72] Inventors: Tamotsu Fujisawa; Mizuo Yamamoto; Genichi Tsuchihashi, all of Sagamihara, Japan

[73] Assignee: Sagami Chemical Research Center, Tokyo, Japan

[22] Filed: April 24, 1970

[21] Appl. No.: 31,769

[30] Foreign Application Priority Data

April 30, 1969 Japan..................................44/32756

[52] U.S. Cl. .........................................................260/609 F
[51] Int. Cl. .......................................................C07c 149/38
[58] Field of Search....................................260/609 F, 609 E

[56] References Cited

UNITED STATES PATENTS 3,211,794  10/1965  Coffield..............................260/609 F
3,057,926  10/1962  Coffield..............................260/609 F

OTHER PUBLICATIONS

Muller et al., Ann., 645, 79 & 89, (1962).

*Primary Examiner*—Joseph Rebold
*Assistant Examiner*—D. R. Phillips
*Attorney*—Flynn & Frishauf

[57] ABSTRACT

A new process for the preparation of 4,4'-thiobis(2,6-di-t-butylphenol) is disclosed. Hindered phenol, 2,6-di-t-butylphenol, is reacted with a sulfur chloride in the absence or presence of a catalytic amount of iron powder or a Lewis acid and the reaction product is then heated with caustic alkali in a solvent. The process yields 4,4'-thiobis(2,6-di-t-butylphenol) economically and in a high yield.

9 Claims, No Drawings

PROCESS FOR PRODUCTION OF SULFUR-CONTAINING PHENOLS

BACKGROUND OF THE INVENTION

The instant invention relates to a process for preparing 4,4'-thiobis(2,6-di-t-butylphenol) which is a useful antioxidant. It is an established fact that phenols react with sulfur dichloride to give thiobisphenol. However, hindered phenols are less reactive than general phenols due to the presence of bulky radicals such as t-butyl radicals in the positions ortho to the hydroxy radical, i.e. 2 and 6-positions. The processes heretofore known for the production of the present compound include the following. In one of the processes, sulfur dichloride is reacted with 2,6-di-t-butylphenol or its sodium salt to synthesize the desired compound (British Pat. No. 898,028; U.S. Pat. No. 3,211,794, etc.). However, the procedure is conductive to only a very low yield of 4,4'-thiobis (2,6-di-t-butylphenol). There is also known a reaction in which 4,4'-dithiobis(2,6-di-t-butylphenol) is treated with an alkali to obtain the desired sulfur-containing phenol compound (E. Müller 5, Ann., 645,79 (1962)), but this method is disadvantageous in that the starting material disulfide can be synthesized only with considerable difficulty.

It is thus clear that none of the conventional processes is commercially satisfactory.

DETAILED DESCRIPTION OF THE INVENTION

It is an object of this invention to provide a new process for preparing 4,4'-thiobis(2,6-di-t-butylphenol). This and other objects of this invention will be apparent from the following description.

An extensive study was conducted by us with a view to finding a process whereby the desired thiobisphenol might be easily synthesized. The instant invention is the culmination of the above research.

We found that a mixture of polysulfides could be obtained by applying a synthetic process we had previously perfected for the synthesis of aromatic sulfides to the sulfuration of 2,6-di-t-butylphenol which is a hindered phenol. We then discovered that if said mixture is treated with alkali hydroxide without preliminary separation and purification procedures, the desired sulfur-containing phenol may be easily obtained. The instant method is extremely simple and conducive to high product yields.

In accordance with the instant invention, a sulfur chloride is reacted with 2,6-di-t-butylphenol in a solvent such as acetonitrile, carbon disulfide or carbon tetrachloride and in the presence or absence of a small amount of a catalyst, and after the solvent is distilled off at the end of the reaction, the reaction mixture is promptly refluxed with alkali hydroxide in a solvent such as, for example, an alcohol.

The sulfur chlorides suitable for use as one of the starting compounds according to the instant invention include both sulfur monochloride ($S_2Cl_2$) and sulfur dichloride ($SCl_2$).

While the aromatic sulfuration reaction utilized in the process of the invention takes place even in the absence of a catalyst, the use of a catalyst is generally preferred. The catalyst mentioned just above is preferably iron powder or a Lewis acid such as ferric chloride, aluminum chloride, titanium chloride, stannic chloride, zinc chloride, etc. A comparatively small amount of the catalyst is necessary to accomplish the object of the invention. Usually, the catalyst may be used in the amount of about 0.0001 mole to about 10 mole percent relative to the sulfur chloride being used.

As regards the solvent which is to be used in the first step of the instant process, any solvent may be employed only if it is capable of dissolving the starting materials and will not react with those materials and the final product.

To ensure a smooth progress of the reaction, acetonitrile, carbon disulfide and carbon tetrachloride are particularly beneficial examples. The solvent which can be profitably employed in the second step of the reaction according to the invention, i.e. in the alkali treatment previously mentioned, is preferably selected from the group consisting of polar solvents such as alcohols, i.e. methanol, ethanol, etc. It is also possible to employ aqueous solutions of alcohols in desired compositions.

In carrying the instant invention into practice, the catalyst is added to a solution of 2,6-di-t-butylphenol in a solvent of the type mentioned, and the sulfur chloride compound is added gradually dropwise in a nitrogen atmosphere at the temperature of −78° to 100° C. and, preferably, in the neighborhood of room temperature.

After the evolution of hydrogen chloride gas has ceased, the solvent is distilled off in the conventional manner, and the solid residue is refluxed with alkali hydroxide in alcohol in an atmosphere of nitrogen gas. The reaction time should vary with different reaction temperatures, but refluxing is generally continued for about 0.5 to 48 hours. After the reaction is complete, the product may be recovered from the reaction mixture in a manner that is conventional per se.

The following examples are not limitative but merely illustrative of the instant invention. In the examples, all parts are by weight unless otherwise specified.

EXAMPLE 1

In 48.0 parts carbon tetrachloride was dissolved 20.6 parts 2,6-t-butylphenol, followed by the addition of a catalytic amount of iron powder. At room temperature, a solution of 6.8 parts sulfur chloride in 32.0 parts carbon tetrachloride was added dropwise over a period of 8 hours, and the mixture was stirred at room temperature for a further 10 hours. The solvent was removed by vacuum distillation, whereupon a mixture of 4,4'-polythiobis(2,6-di-t-butylphenol) compounds was obtained. This mixture, on assay, was found to comprise the following. 4,4'-thiobis(2,6-di-t-butylphenol) 23 percent; 4,4'-dithiobis(2,6-di-t-butylphenol) 11 percent; 4,4'-trithiobis(2,6-di-t-butylphenol) 19 percent; 4,4'-tetrathiobis(2,6-di-t-butylphenol) 28 percent; and 2,6-di-t-butylphenol 19 percent.

This mixture was promptly dissolved in 180 parts of a solution of potassium hydroxide in 95 percent ethanol (2N) which had previously been refluxed in nitrogen streams for 2 hours.

The solution was then refluxed in a nitrogen atmosphere for 12 hours, at the end of which time it was neutralized with 3N-hydrochloric acid. The resulting precipitates were recovered by extraction with benzene, followed by recrystallization from methanol.

The procedure yielded crystals 4,4'-thiobis (2,6-di-t-butylphenol) melting at 134°–136° C. Yield 77 percent.

The following table shows the yields of 4,4'-thiobis(2,6-di-t-butylphenol) when the mixtures of 4,4'-polythiobis(2,6-di-t-butylphenol) as that obtained above were treated with the alkali in various solvents.

TABLE 1

| Solvent Concentration | (N) | Reaction time (in hours) | Reaction temp. | % Yield |
|---|---|---|---|---|
| $CH_3OH$ | 2 | 12 | Reflux | 64 |
| $CH_3OH$ | 2 | 24 | Reflux | 71 |
| $CH_3OH$ | 4 | 48 | Reflux | 76 |
| $C_2H_5OH(99\%)$ | 2 | 12 | Reflux | 71 |
| $C_2H_5OH(95\%)$ | 2 | 12 | Reflux | 77 |
| $C_2H_5OH(70\%)$ | 2 | 12 | Reflux | 76 |
| $C_2H_5OH(50\%)$ | 2 | 12 | Reflux | 71 |
| DMA* | 2 | 6 | 75°–85°C | 6 |
| DMA* | 2 | 24 | 120°–130°C | 12 |

*DMA = dimethylacetamide

EXAMPLE 2

2,6-di-t-butylphenol was reacted with sulfur chloride compounds in various solvents, using different catalysts and reaction temperatures, and after the solvent was distilled off in each instance, the reaction mixture was refluxed in 180 parts of 2N potassium hydroxide in methanol for 24 hours, in an atmosphere of nitrogen gas. The resulting product was treated in a manner similar to Example 1 to obtain 4,4'-thiobis (2,6-di-t-butylphenol). The results are summarized in Table 2.

TABLE 2

| Sulfur chloride | Solvent | Catalyst | Reaction temperature | % Yield |
| --- | --- | --- | --- | --- |
| $S_2Cl_2$ | $CH_3CN$ | none | room temperature | 73 |
| $S_2Cl_2$ | $CH_3CN$ | Fe | room temperature | 73 |
| $S_2Cl_2$ | $CH_3CN$ | Fe | −30°−−40°C | 72 |
| $S_2Cl_2$ | $CH_3CN$ | $FeCl_3$ | room temperature | 61 |
| $S_2Cl_2$ | $CS_2$ | Fe | room temperature | 65 |
| $SCl_2$ | $CH_3CN$ | Fe | −30°−−40°C | 84 |
| $SCl_2$ | $CS_2$ | Fe | room temperature | 85 |

EXAMPLE 3

In 95 parts carbon disulfide was dissolved 51.5 parts 2,6-di-t-butylphenol, and a catalytic amount (0.005 part) of iron powder was added. To the system was gradually added dropwise a solution of 12.5 parts sulfur dichloride in 70 parts carbon disulfide. After the dropwise addition was complete, the mixture was stirred at room temperature for 5 hours, at the end of which time the solvent was distilled off at atmospheric pressure.

The reaction mixture was promptly added, under cooling, to a solution of 15 parts sodium hydroxide in 160 parts methanol, with nitrogen gas being bubbled into the system The mixture was refluxed in a nitrogen atmosphere for 3 hours, at the end of which time it was neutralized with 3 N (approx.) hydrochloric acid. The reaction mixture was then extracted with benzene. Upon removal of the benzene by distillation, 55.2 parts 4,4'-thiobis (2,6-di-t-butylphenol) was obtained. The product was allowed to recrystallize from n-hexane, whereupon 41.8 parts of purified crystals were obtained m.p. 137.0°–138.0° C. Yield 76 percent.

We claim:

1. A process for preparing 4,4'-thiobis(2,6-di-t-butylphenol) which comprises the steps of reacting 2,6-di-t-butylphenol with a sulfur chloride in a solvent to form a reaction product containing mono-and a mixture of poly-thio phenols and, then, heating the reaction product in the presence of an alkali hydroxide in a loweralkyl alcohol solvent to increase the yield of the mono-thiophenol and recovering said 4,4'-thiobis(2,6-di-t-butylphenol) from the resulting product.

2. A process for preparing 4,4'-thiobis(2,6-di-t-butylphenol according to claim 1, wherein the reaction of 2,6-di-t-butylphenol with a sulfur chloride is conducted in the presence of a catalytic amount of iron powder.

3. A process for preparing 4,4'-thiobis(2,6-di-t-butylphenol according to claim 1, wherein the reaction of 2,6-di-t-butylphenol with a sulfur chloride is conducted in the presence of a catalytic amount of Lewis acid.

4. A process according to claim 1, wherein said hydroxide is selected from the group consisting of potassium hydroxide and sodium hydroxide.

5. A process according to claim 1, wherein said sulfur chloride is selected from the group consisting of sulfur monochloride and sulfur dichloride.

6. A process according to claim 2, wherein the amount of said catalyst is in the range of 0.0001 mole to 10 mole percent based on the sulfur chloride.

7. A process according to claim 1, wherein the solvent for use in the first step is selected from the group consisting of acetonitrile, carbon disulfide and carbon tetrachloride.

8. A process according to claim 1 wherein the solvent in the second step is methyl alcohol.

9. A process according to claim 1 wherein the solvent in the second step is ethyl alcohol.

* * * * *